(12) United States Patent
Shi et al.

(10) Patent No.: US 11,362,369 B2
(45) Date of Patent: *Jun. 14, 2022

(54) NON-AQUEOUS ELECTROLYTE OF LITHIUM-ION BATTERY AND LITHIUM-ION BATTERY

(71) Applicant: SHENZHEN CAPCHEM TECHNOLOGY CO., LTD., Guangdong (CN)

(72) Inventors: Qiao Shi, Guangdong (CN); Shiguang Hu, Guangdong (CN); Qun Chen, Guangdong (CN); Li Wang, Guangdong (CN); Zhou He, Guangdong (CN); Jiaojiao Yun, Guangdong (CN)

(73) Assignee: SHENZHEN CAPCHEM TECHNOLOGY CO., LTD., Shenzhen (CN)

(*) Notice: Subject to any disclaimer, the term of this patent is extended or adjusted under 35 U.S.C. 154(b) by 153 days.

This patent is subject to a terminal disclaimer.

(21) Appl. No.: 16/205,258

(22) Filed: Nov. 30, 2018

(65) Prior Publication Data

US 2019/0103633 A1    Apr. 4, 2019

Related U.S. Application Data

(63) Continuation-in-part of application No. PCT/CN2016/113044, filed on Dec. 29, 2016.

(30) Foreign Application Priority Data

Nov. 25, 2016   (CN) .......................... 201611054013.2

(51) Int. Cl.
| | | |
|---|---|---|
| *H01M 10/0567* | (2010.01) | |
| *H01M 10/0525* | (2010.01) | |
| *H01M 10/0569* | (2010.01) | |
| *H01M 4/505* | (2010.01) | |
| *H01M 4/02* | (2006.01) | |
| *H01M 4/525* | (2010.01) | |

(52) U.S. Cl.
CPC ....... *H01M 10/0567* (2013.01); *H01M 4/505* (2013.01); *H01M 10/0525* (2013.01); *H01M 10/0569* (2013.01); *H01M 4/525* (2013.01); *H01M 2004/028* (2013.01); *H01M 2300/004* (2013.01); *H01M 2300/0025* (2013.01)

(58) Field of Classification Search
CPC ............. H01M 10/0567; H01M 4/505; H01M 10/0525; H01M 10/0569; H01M 4/525; H01M 2004/028; H01M 2300/0025–0042
See application file for complete search history.

(56) References Cited

U.S. PATENT DOCUMENTS

| | | | | |
|---|---|---|---|---|
| 2016/0190644 | A1* | 6/2016 | Takase ................ | H01M 4/405 |
| | | | | 429/333 |
| 2016/0240888 | A1* | 8/2016 | Hamasaki ......... | H01M 10/0525 |
| 2018/0019474 | A1* | 1/2018 | Lee ..................... | H01M 4/628 |
| 2020/0020972 | A1* | 1/2020 | Shi ..................... | H01M 10/0567 |

FOREIGN PATENT DOCUMENTS

| | | |
|---|---|---|
| CN | 103038931 A | 4/2013 |
| CN | 103151559 A | 6/2013 |
| CN | 103633369 A | 3/2014 |
| CN | 104300174 A | 1/2015 |
| JP | 2011096462 A | 5/2011 |
| JP | 2013098034 A | 5/2013 |

OTHER PUBLICATIONS

International Search Report of PCT Patent Application No. PCT/CN2016/113044 dated Jul. 6, 2017.

* cited by examiner

*Primary Examiner* — Cynthia H Kelly
*Assistant Examiner* — Niara Trant

(57) ABSTRACT

A lithium-ion battery non-aqueous electrolyte and a lithium-ion battery. The non-aqueous electrolyte comprises at least one selected from the compounds represented by structural formula I and II; in formula I, R1 and R2 are independently selected from alkenyl having 2-5 carbon atoms and alkynyl having 2-5 carbon atoms; in formula II, R3 is selected from alkenyl having 2-5 carbon atoms and alkynyl having 2-5 carbon atoms. The compound represented by formula I or II is added in the electrolyte; the compound contains unsaturated bond(s) and hexafluorisopropyl; the unsaturated bond(s) form passivation film on cathode and anode surfaces to inhibit decomposition of the electrolyte on the cathode & anode surface and damage of the cathode material structure; moreover, the polymerization degree of unsaturated bond(s) can be inhibited to some extent due to steric hindrance relationship of fluoroisopropyl functional groups, so as to improve high-temperature performance of the lithium-ion battery while guaranteeing low-temperature performance.

9 Claims, No Drawings

NON-AQUEOUS ELECTROLYTE OF LITHIUM-ION BATTERY AND LITHIUM-ION BATTERY

CROSS-REFERENCE TO RELATED APPLICATIONS

The present application is a continuation-in-part application of International (PCT) Patent Application No. PCT/CN2016/113044 filed on Dec. 29, 2016, which claims foreign priority of Chinese Patent Application No. 201611054013.2, filed on Nov. 25, 2016, the contents of all of which are hereby incorporated by reference.

TECHNICAL FIELD

The present application relates to the field of lithium-ion battery electrolyte, and in particular to a non-aqueous electrolyte of lithium-ion battery and a lithium-ion battery.

BACKGROUND ART

Lithium-ion battery has been widely used in digital products such as mobile phones and notebook computers because of its light weight, small size, high operating voltage, high energy density, large output power, no memory effect and long cycle life. It is also considered to be one of the best choices for electric vehicles and large energy storage devices. At present, digital electronic products such as smart phones and tablet computers are increasingly demanding energy density of battery, making it difficult for commercial lithium-ion battery to meet the requirements.

The decomposition of the electrolyte on the surface of the positive electrode material is more serious when lithium-ion battery is in the high-temperature charge-discharge cycle or high-temperature storage, the oxidative decomposition products of electrolyte continuously deposits on the surface of the positive electrode, leading to continuous increase in the impedance of the positive electrode surface, resulting in deterioration of battery performance. Especially when the nickel content in the positive electrode material is high, the surface activity of the positive electrode material is higher, and the decomposition of the electrolyte is more serious. In addition, increasing the charging voltage of lithium-ion battery further exacerbates the leaching of the metal-ions of the positive electrode material, and the leaching metal-ions not only catalyze the decomposition of the electrolyte but also destroy the passivation film on the negative electrode. Especially in the long-term high-temperature storage or high-temperature cycle, the leaching of the positive electrode metal-ions is more serious, resulting in rapid deterioration of the battery performance.

In order to suppress the deterioration of battery performance caused by the leaching of the positive electrode metal-ions and the decomposition of the electrolyte, an inert metal oxide such as $Al_2O_3$, $AlF_3$, $ZnO$ or the like may be coated on the surface of the positive electrode material, and positive and negative protective additives may be added to the electrolyte. Chinese Patent Application Nos. 201310046105.6 and 201410534841.0 respectively disclose an electrolyte containing allyl phosphate and propargyl phosphate, which can improve the high-temperature storage and high-temperature cycle performance of the battery. However, the inventors of the present application have found through extensive experiments that although the unsaturated phosphate ester can significantly improve the high-temperature storage and high-temperature cycle performance of the battery, the internal resistance of the battery is obviously increased, and the low-temperature performance and rate performance of the battery are lowered, especially the low-temperature cycle performance, a large area of lithium precipitation is formed on the surface of the negative electrode. Chinese Patent Application No. 201180037584.4 also discloses an electrolyte of unsaturated phosphate containing triple bonds, wherein a fluorine-containing substituted unsaturated phosphate is mentioned, however, the inventors of the present application have found through a large number of experiments that the electrolyte of unsaturated phosphate containing triple bonds still has poor low-temperature performance, and a large area of lithium precipitation when charged at low temperature, causing serious safety hazards.

SUMMARY OF PRESENT INVENTION

The purpose of the present application is to provide a new lithium-ion battery non-aqueous electrolyte and its application.

In order to achieve the above object, the present application adopts the following technical solutions:

An aspect of the present application discloses a lithium-ion battery non-aqueous electrolyte, comprising at least one selected from the group consisting of the compounds represented by structural formula I and structural formula II;

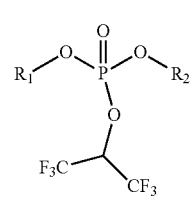
(Structural formula I)

wherein, $R_1$ and $R_2$ are each independently selected from alkenyl having 2-5 carbon atoms and alkynyl having 2-5 carbon atoms, respectively,

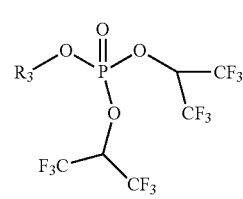
(Structural formula II)

wherein, R3 is selected from alkenyl having 2-5 carbon atoms and alkynyl having 2-5 carbon atoms.

It should be noted that the lithium-ion battery non-aqueous electrolyte of the present application is mainly characterized in that the compound represented by structural formula I or the compound represented by structural formula II is added to the electrolyte, and the compound contains unsaturated bond(s) and hexafluoroisopropyl, the unsaturated bond(s) can form a passivation film on the surface of the positive and negative electrodes, effectively suppressing the decomposition reaction of the electrolyte on the surface of the positive and negative electrodes, and suppressing the structure of the positive electrode material from being destroyed. Moreover, due to the steric hindrance relationship of the hexafluoroisopropyl functional group, the degree of polymerization of the unsaturated bond(s) can be suppressed to some extent; at the same time, the hexafluoroisopropyl group can also participate in the film formation reaction, suppressing the increase of the internal resistance of battery. While improving the high-temperature performance of the lithium-ion battery, the low-temperature performance and rate performance of the lithium-ion battery are ensured, so that it has excellent comprehensive performance. Conventional unsaturated phosphates, such as 2,2,2-trifluoroethyl bis (propargyl) phosphate, do not have the effect of the compound represented by structural formula I in the present invention due to their steric structure, and still have problems of poor low-temperature performance and lithium precipitation (e.g., the result of Comparative Example 2), the object of the present invention cannot be achieved.

Therefore, the high-and-low temperature performance and the comprehensive performance of the electrolyte and the battery using the electrolyte can be adjusted by adjusting the amount of the compound represented by structural formula I or the compound represented by structural formula II. In general, for the electrolyte of the present application, the amount of the compound of formula I or formula II may be used according to the normal additive quantity; however, it should be particularly noted that the amount recommended in the present application is that the content of the compound represented by formula I or formula II is 0.1% to 5% of the total mass of the non-aqueous electrolyte of the lithium-ion battery. Wherein, when the amount of the compound represented by formula I or formula II is less than 0.1%, the effect of improving the high-temperature storage of the non-aqueous electrolyte battery is lowered; and when it exceeds 5%, the passivation film formed on the surface of the positive and negative electrodes may get thicker, the internal resistance of battery is increased, which is not conducive to better consideration of the low-temperature performance of battery.

It should be noted that the key of the present application is to add a compound represented by formula I or formula II to the non-aqueous electrolyte of the lithium-ion battery. As for other components, such as non-aqueous organic solvent and lithium salt, reference may be made to the existing non-aqueous electrolyte, and other additives may be added to the non-aqueous electrolyte to increase the corresponding function, which is not specifically limited herein. However, in the preferred embodiment of the present application, the non-aqueous organic solvent, lithium salt and other additives normally contained in the nonaqueous electrolyte of the lithium-ion battery are specifically limited in order to achieve a better effect, which will be described in detail in the subsequent schemes.

Preferably, the alkenyl of 2 to 5 carbon atoms includes, but is not limited to, vinyl, allyl, 3-butenyl, isobutenyl, and 4-pentenyl, the alkynyl of 2 to 5 carbon atoms includes, but is not limited to, ethynyl, propargyl, 3-butynyl, and 1-methyl-2-propynyl.

Preferably, the compound represented by structural formula I is hexafluoroisopropyl bis (propargyl) phosphate or hexafluoroisopropyl bis (allyl) phosphate, the compound represented by structural formula II is bis (hexafluoroisopropyl) propargyl phosphate or bis (hexafluoroisopropyl) allyl phosphate.

Preferably, in the non-aqueous electrolyte, the compound represented by structural formula I or the compound represented by structural formula II accounts for 0.1%-5% of the total mass of the non-aqueous electrolyte solution.

Preferably, the electrolyte further comprises one or more of cyclic carbonate, cyclic sultone, and cyclic sulfate.

Preferably, the cyclic carbonate is at least one selected from the group consisting of vinylene carbonate, vinylethylene carbonate, and fluoroethylene carbonate.

Preferably, the cyclic sultone is selected from the group consisting of one or more of 1,3-propane sultone, 1,4-butane sultone, and 1,3-propane sultone.

It should be noted that vinylene carbonate (VC), vinylethylene carbonate (VEC), fluoroethylene carbonate (FEC), 1,3-propane sultone (PS), or 1,4-butane sultone (BS), these are common additives. In the non-aqueous electrolyte of lithium-ion battery of the present application, it is also possible to add these additives to obtain corresponding functions; also, it is possible to add only the compound of formula I without those additives, the effects of the passivation film formation on the surface of the positive and negative electrodes, the suppression of the decomposition of the electrolyte on the surface of the positive and negative electrodes and the destruction of the positive electrode material structure of the present application can also be reached.

Preferably, the non-aqueous electrolyte of the lithium-ion battery comprises a nonaqueous organic solvent, and the nonaqueous organic solvent is at least one selected from the group consisting of ethylene carbonate, propylene carbonate, butylene carbonate, dimethyl carbonate, diethyl carbonate, ethyl methyl carbonate and methyl propyl carbonate.

More preferably, the nonaqueous organic solvent is a composition of ethylene carbonate, diethyl carbonate and ethyl methyl carbonate.

Another aspect of the present application discloses the use of the lithium-ion battery non-aqueous electrolyte of the present application in lithium-ion battery or storage capacitor.

Another aspect of the application discloses a lithium-ion battery, comprising a positive electrode, a negative electrode, a separator interposed between the positive electrode and the negative electrode, and an electrolyte solution, wherein the electrolyte solution is the non-aqueous electrolyte of the lithium-ion battery of the present application.

It can be understood that the key of the lithium-ion battery of the present application is the use of the lithium-ion battery non-aqueous electrolyte of the present application, so that a passivation film is formed on the surface of the positive and negative electrodes, thereby effectively inhibiting the decomposition reaction of the electrolyte on the surface of the positive and negative electrodes, and inhibiting the structure of the positive electrode material from being destroyed. At the same time, it will not increase the internal resistance of the battery, ensuring the high and low temperature performance and rate performance of the battery. As for other components in the lithium-ion battery, such as the positive electrode, negative electrode, and the separator, reference may be made to conventional lithium-ion batteries. In a preferred embodiment of the present application, the active material for the positive electrode is specifically limited.

Preferably, the active material for the positive electrode is at least one of $LiNi_xCo_yMn_zL_{(1-x-y-z)}O_2$, wherein L is Al, Sr, Mg, Ti, Ca, Zr, Zn, Si or Fe, $0 \le x \le 1$, $0 \le y \le 1$, $0 \le z \le 1$, $0 < x+y+z \le 1$. For example, in the present invention, the positive electrode active material may be lithium cobaltate, represented by the following general formula: $LiCo_aL_{(1-a)}O_2$, $0 < a \le 1$.

With the above technical solutions, the beneficial effects of the present application are:

In the lithium-ion battery non-aqueous electrolyte of the present application, a compound represented by structural formula I or the compound represented by structural formula II is added thereto. Because the compound contains unsaturated bond(s) and hexafluoroisopropyl, the unsaturated bonds polymerize on the surface of the positive and negative electrodes to form a passivation film, inhibiting decomposition of the electrolyte on the surface of the positive and negative electrodes and destruction of the structure of the positive electrode material; Moreover, because of the steric hindrance relationship of the hexafluoroisopropyl functional group, the degree of polymerization of the unsaturated bond can be suppressed to some extent. At the same time, the hexafluoroisopropyl group can also participate in the film formation reaction, thereby suppressing the increase in the internal resistance of the battery; While improving the high-temperature performance of the lithium-ion battery, the low-temperature performance and rate performance of the lithium-ion battery are guaranteed.

DETAILED DESCRIPTION OF EMBODIMENTS

The application is characterized in that, in a series of studies on electrolyte, it was found that the compound of structural formula I not only can improve the high-temperature storage and high-temperature cycle performance of the battery, but also does not increase the internal resistance of the battery, and at the same time ensures the low-temperature performance and rate performance of the battery, especially the low-temperature cycle performance, and the phenomenon of large-area lithium precipitation on the surface of the negative electrode is avoided.

It should be noted that the Chinese patent application Nos. 201310046105.6 and 201410534841.0 mentioned in the Background Art are actually also proposed by the applicant. The applicant conducted a series of studies on non-aqueous electrolyte of lithium-ion battery, and proposed patent applications for a plurality of additives including Nos. 201310046105.6 and 201410534841.0. The electrolyte containing allyl phosphate and propargyl phosphate proposed by the applicant has a good effect in improving the high-temperature performance of the battery, but it has been found in in-depth research that it has influences on low-temperature performance of the battery.

Chinese Patent Application No. 201180037584.4 also discloses an electrolyte of unsaturated phosphate containing triple bonds, wherein a fluorine-containing substituted unsaturated phosphate is mentioned, however, the inventors of the present application have found through a large number of experiments that the electrolyte of unsaturated phosphate containing triple bonds still has poor low-temperature performance, and a large area of lithium precipitation when charged at low temperature, causing serious safety hazards. Accordingly, in subsequent studies and experiments, the inventors have found that the addition of the compound represented by formula I to the electrolyte could realize high temperature property without affecting its low temperature property, thus the present application has been made.

The present application will be further described in detail below with specific embodiments and accompanying drawings. The following examples are only intended to further illustrate the application, and shall not be considered to limit the invention.

EXAMPLE

In this example, electrolytes were prepared according to the components and ratios shown in Table 1, in which a plurality of lithium-ion battery non-aqueous electrolytes of the present application were designed, and a plurality of comparative examples are shown in Table 1.

The nonaqueous organic solvent of this example is a composition of ethylene carbonate, diethyl carbonate and ethyl methyl carbonate, and the lithium salt is lithium hexafluorophosphate. It can be understood that the non-aqueous organic solvent and lithium salt used in this example are only a specific embodiment, and other commonly used non-aqueous organic solvents in the field, such as ethylene carbonate, propylene carbonate, butylene carbonate, dimethyl carbonate, diethyl carbonate, ethyl methyl carbonate and methyl propyl carbonate, other commonly used lithium salts, such as $LiBF_4$, LiBOB, LiDFOB, $LiPO_2F_2$, $LiSbF_6$, $LiAsF_6$, $LiN(SO_2CF_3)_2$, $LiN(SO_2C_2F_5)_2$, $LiC(SO_2CF_3)_3$ and $LiN(SO_2F)_2$ can also be used in this example, and are not specifically limited herein.

(Preparation for the Electrolyte of This Example)

Ethylene carbonate, ethyl methyl carbonate and diethyl carbonate were mixed in a volume ratio of EC:EMC:DEC=3:3:4, after mixing, a lithium hexafluorophosphate having a concentration of 1.0 mol/L was added, and an additive was added according to Table 1. The percentages in Table 1 are by weight percent, i.e., the additive accounts for a percentage of the total mass of the electrolyte.

TABLE 1

| | Structural formula I or structural formula II and dosage | Other additives and dosage |
|---|---|---|
| Example 1 | hexafluoroisopropyl bis (propargyl) phosphate: 1% | — |
| Example 2 | bis (hexafluoroisopropyl) propargyl phosphate: 1% | — |
| Example 3 | hexafluoroisopropyl bis (allyl) phosphate: 1% | — |
| Example 4 | bis (hexafluoroisopropyl) allyl phosphate: 1% | — |
| Comparative example 1 | — | Tripropargyl phosphate: 1% |
| Comparative example 2 | — | 2,2,2-trifluoroethyl bis (propargyl) phosphate: 1% |
| Comparative example 3 | — | — |
| Example 5 | hexafluoroisopropyl bis (propargyl) phosphate: 0.05% | — |
| Example 6 | hexafluoroisopropyl bis (propargyl) phosphate: 0.1% | — |
| Example 7 | hexafluoroisopropyl bis (propargyl) phosphate: 0.2% | — |
| Example 8 | hexafluoroisopropyl bis (propargyl) phosphate: 0.5% | — |
| Example 9 | hexafluoroisopropyl bis (propargyl) phosphate: 1.5% | — |
| Example 10 | hexafluoroisopropyl bis (propargyl) phosphate: 2% | — |
| Example 11 | hexafluoroisopropyl bis (propargyl) phosphate: 5% | — |
| Example 12 | hexafluoroisopropyl bis (propargyl) phosphate: 6% | — |
| Example 13 | hexafluoroisopropyl bis (propargyl) phosphate: 1% | VC: 1% |
| Example 14 | hexafluoroisopropyl bis (propargyl) phosphate: 1% | FEC: 1% |
| Example 15 | hexafluoroisopropyl bis (propargyl) phosphate: 1% | VEC: 1% |
| Example 16 | hexafluoroisopropyl bis (propargyl) phosphate: 1% | PS: 1% |
| Example 17 | hexafluoroisopropyl bis (propargyl) phosphate: 1% | BS: 1% |
| Comparative example 4 | — | VC: 1% |
| Comparative example 5 | — | FEC: 1% |

TABLE 1-continued

| | Structural formula I or structural formula II and dosage | Other additives and dosage |
|---|---|---|
| Comparative example 6 | — | VEC: 1% |
| Comparative example 7 | — | PS: 1% |
| Comparative example 8 | — | BS: 1% |

In Table 1, Comparative example 3 did not add any additives.

In the lithium-ion battery of this example, the positive active material was $LiNi_{0.5}Co_{0.2}Mn_{0.3}O_2$, the negative electrode was made of graphite and conductive carbon black, and the separator was made of three layers of polypropylene, polyethylene and polypropylene. Details as follows:

(Preparation for the Positive Electrode)

The positive electrode active material $LiNi_{0.5}Co_{0.2}Mn_{0.3}O_2$, conductive carbon black and binder polyvinylidene difluoride were mixed according to the mass ratio of 96.8:2.0:1.2, and dispersed in N-methyl-2-pyrrolidone to obtain a positive electrode slurry. The positive electrode slurry was uniformly coated on both sides of the aluminum foil, dried, calendered and vacuum-dried, and the nickel lead wire was welded by an ultrasonic welding machine to obtain a positive electrode plate, and the thickness of the electrode plate was between 120 and 150 μm.

(Preparation for the Negative Electrode)

The graphite, conductive carbon black, binder styrene butadiene rubber and carboxymethyl cellulose were mixed at a mass ratio of 96:1:1.2:1.8, dispersed in deionized water to obtain a negative electrode slurry, and the negative electrode slurry was coated on both sides of the copper foil, dried, calendered and vacuum-dried, and the nickel lead wire was welded by an ultrasonic welding machine to obtain a negative electrode plate, and the thickness of the electrode plate was between 120 and 150 μm.

(Preparation for the Separator)

The separator was made of three layers of polypropylene, polyethylene and polypropylene, with a thickness of 20 μm.

(Battery Assembly Method)

A three-layer separator having a thickness of 20 μm was placed between the positive electrode plate and the negative electrode plate, and then the sandwich structure composed of the positive electrode plate, the negative electrode plate and the separator was wound, and then the winding body was flattened and placed in an aluminum foil packaging bag, vacuum-baked at 75° C. for 48 hours to obtain an unfilled battery core; the electrolyte prepared above was injected into the battery core, vacuum-packed, standed for 24 hours.

Then follow the steps below to carry out the formation of the first charge: charging at 0.05 C constant current for 180 min, charging at 0.1 C constant current to 3.95V, vacuum sealing for the second time, standing at 45° C. for 48 h, and then further charging to 4.35V at 0.2 C constant current, the cutoff current was 0.01 C, and then discharging to 3.0V at a constant current of 0.2 C.

This example tested each electrolyte battery's capacity retention ratio at 45° C. 1 C, 300 cycles, discharge efficiency at −20° C. 0.2 C, as well as the capacity retention ratio, capacity recovery ratio, and thickness expansion after storage for 28 days at 60° C., respectively. The lithium precipitation of the battery was observed. The specific test methods were as follows:

(1) Capacity retention ratio at 45° C. 1 C, 300 cycles, is the test of the high-temperature cycle performance of the battery, the specific test method includes: at 45° C., the formed battery was charged to 4.35V at 1 C constant current constant voltage, the cutoff current was 0.01 C, and then discharged to 3.0V at a constant current of 1 C. After 300 cycles of charging/discharging, the capacity retention after the 300th cycle was calculated to evaluate the high-temperature cycle performance. The formula for calculating the capacity retention ratio at 45° C. 1 C, 300 cycles is as follow:

300th cycle capacity retention ratio (%)=(300th cycle discharge capacity/first cycle discharge capacity)×100%

(2) −20° C. 0.2 C discharge efficiency, is the test of the low-temperature discharge performance of the battery, the specific test method includes: at 25° C., the formed battery was charged to 4.35V at a constant current of 0.2 C, the cutoff current was 0.01 C, then discharged to 3.0 V at a constant current of 0.2 C, and the discharge capacity was recorded. Then the battery was charged to 4.35V at 0.2 C constant current constant voltage, the cutoff current was 0.01 C, and the battery was remained in a temperature environment of −20° C. for 12 hours, then discharged to 3.0V at 0.2 C constant current, the discharge capacity was recorded. The calculation formula of −20° C. 0.2 C discharge efficiency is as follows:

Low-temperature discharge efficiency (%) at −20° C.=0.2 C discharge capacity (−20° C.)/0.2 C discharge capacity (25° C.)

3) The test method of capacity retention ratio, capacity recovery ratio and thickness expansion ratio after storage for 28 days at 60° C. includes: the formed battery was charged to 4.35 V at a room temperature at a constant current of 1 C, the cutoff current was 0.01 C, then discharged to 3.0 V at 1 C constant current, the initial discharge capacity of the battery was measured, and then charged to 4.35 V at 1 C constant current constant voltage, the cutoff current was 0.01 C, the initial thickness of the battery was measured, and then the battery was stored at 60° C. for 28 days, the thickness of the battery was measured, then discharged to 3.0 V at a constant current of 1 C, capacity retention ratio of the battery was measured, and then charged to 4.35V at a constant current of 1 C, the cutoff current was 0.01 C, and then discharged to 3.0V with a constant current of 1 C, capacity recovery ratio was measured. The formulas for calculating the capacity retention ratio, capacity recovery ratio, and thickness expansion ratio are as follows:

Battery capacity retention ratio (%)=retention capacity/initial capacity×100%

Battery capacity recovery ratio (%)=recovery capacity/initial capacity×100%

Battery thickness expansion ratio (%)=(thickness after 28 days−initial thickness)/initial thickness×100%

(3) The method for observing lithium precipitation includes, after the formed battery was charged at 0° C. 0.3 C, the degree of lithium precipitation of the negative electrode was measured, based on a 5-point system. The lower the point, the more serious the lithium precipitation. Specifically, 5 means no lithium precipitation, 4 means slight lithium precipitation, 3 means normal lithium precipitation, 2 means heavy lithium precipitation, and 1 means severe lithium precipitation.

The test results are shown in Table 2.

TABLE 2

Test results

| | Capacity retention ratio after 300 cycles at 45° C. | Discharge efficiency at −20° C. 0.2 C | Storage for 28 days at 60° C. | | | Degree of lithium precipitation |
| --- | --- | --- | --- | --- | --- | --- |
| | | | Capacity retention ratio | Capacity recovery ratio | Thickness expansion ratio | |
| Example 1 | 78.9% | 70.8% | 83.6% | 87.4% | 15.2% | 5 |
| Example 2 | 76.2% | 73.5% | 82.8% | 86.5% | 16.1% | 5 |
| Example 3 | 77.9% | 70.2% | 84.1% | 88.4% | 15.5% | 5 |
| Example 4 | 76.8% | 74.5% | 83.1% | 87.1% | 15.7% | 5 |
| Comparative example 1 | 75% | 60.2% | 82% | 85.3% | 15% | 1 |
| Comparative example 2 | 70.1% | 65.1% | 78.1% | 83.2% | 26.1% | 2 |
| Comparative example 3 | 55.6% | 70.5% | 38% | 42.6% | 35% | 4 |
| Example 5 | 69.9% | 70.1% | 40% | 43% | 30% | 5 |
| Example 6 | 72.9% | 70.5% | 80.5% | 85.1% | 18.8% | 5 |
| Example 7 | 73.1% | 72.5% | 80.8% | 85.4% | 18.2% | 5 |
| Example 8 | 77% | 72.1% | 82.3% | 86.6% | 16.1% | 5 |
| Example 9 | 80% | 70.1% | 84.6% | 88.4% | 13.2% | 5 |
| Example 10 | 82.5% | 68.5% | 84.4% | 88.3% | 10.3% | 5 |
| Example 11 | 83.2% | 69.1% | 84.7% | 87.9% | 8.2% | 5 |
| Example 12 | 83.4% | 66.5% | 85.1% | 89.4% | 7.1% | 4 |
| Example 13 | 82.2% | 70.1% | 85.5% | 88.9% | 17.2% | 5 |
| Example 14 | 80.6% | 72.3% | 84.2% | 88.1% | 19.1% | 5 |
| Example 15 | 84.3% | 65.1% | 86.4% | 90.2% | 10.1% | 4 |
| Example 16 | 81.5% | 69.1% | 85.1% | 89.1% | 14.3% | 5 |
| Example 17 | 82.4% | 70.6% | 84.8% | 88.6% | 14.1% | 5 |
| Comparative example 4 | 62.6% | 65.3% | 60.3% | 64.5% | 30.2% | 5 |
| Comparative example 5 | 60.2% | 72.4% | 58.6% | 64.2% | 35.3% | 5 |
| Comparative example 6 | 65.3% | 60.1% | 65.2% | 70.1% | 20.1% | 2 |
| Comparative example 7 | 57.5% | 68.2% | 62.1% | 66.5% | 25.3% | 4 |
| Comparative example 8 | 58.6% | 69.8% | 61.9% | 65.1% | 25.8% | 4 |

According to the results of Table 2, it can be seen by comparing Examples 1-4 and Comparative examples 1-3, as additives, hexafluoroisopropyl bis (propargyl) phosphate, bis (hexafluoroisopropyl) propargyl phosphate, hexafluoroisopropyl bis (allyl) phosphate and bis (hexafluoroisopropyl) allyl phosphate had good high-temperature performance and low-temperature performance; though those in Comparative examples 1 and 2 had better high-temperature performance, the low-temperature performance was significantly poor and there was a phenomenon of lithium precipitation. No addictives were added in Comparative example 3, its high-temperature performance was poor. The capacity retention ratio was only 55.6% at 45° C. 1 C, 300 cycles, moreover, the capacity retention ratio and capacity recovery ratio after storage at 60° C. for 28 days were also low, only 38% and 42.6%, and the expansion was obvious, the thickness expansion ratio was 35%.

A further in-depth research shows, the key to improving the high-temperature performance and low-temperature performance of hexafluoroisopropyl bis (propargyl) phosphate, bis (hexafluoroisopropyl) propargyl phosphate, hexafluoroisopropyl bis (allyl) phosphate and bis (hexafluoroisopropyl) allyl phosphate as additives was that, these compounds contain unsaturated bonds and hexafluoroisopropyl, the unsaturated bonds can form a passivation film on the surface of the positive and negative electrodes, effectively suppressing the decomposition reaction of the electrolyte on the surface of the positive and negative electrodes, and suppressing the structure of the positive electrode material from being destroyed. Moreover, because of the steric hindrance relationship of the hexafluoroisopropyl functional group, the degree of polymerization of the unsaturated bond can be suppressed to some extent. At the same time, the hexafluoroisopropyl group can also participate in the film formation reaction, thereby suppressing the increase in the internal resistance of the battery. Therefore, it is understood that in addition to the four compounds in Examples 1-4, other compounds of the same structure as Formula I of the present application could have similar functions and effects.

It can be seen by comparing Examples 6-11 and Example 5 and 12, that the content of hexafluoroisopropyl bis (propargyl) phosphate was preferably 0.1% to 5% of the total mass of the lithium-ion battery non-aqueous electrolyte;

When it was less than 0.1%, the effect of improving high-temperature storage of the non-aqueous electrolyte battery would decrease; and when it exceeded 5%, the passivation film formed on the surface of the positive and negative electrodes may be thicker to increase the internal resistance of the battery, which is disadvantageous to the improvement of battery performance.

It can be seen by comparing Examples 13-17 and Comparative examples 4-8, hexafluoroisopropyl bis (propargyl) phosphate can be used in combination with other commonly used additives to further improve high-temperature performance. Except for Example 15 in which VEC was added, other additives did not have much influence on low-temperature performance. While for the capacity retention ratio and capacity recovery ratio after storage for 28 days at 60° C., there were slight increases after adding other additives, and no significant influence on the thickness expansion ratio. Compared with Comparative examples 4-8 using other additives alone, the use of combination of hexafluoroisopropyl bis (propargyl) phosphate, did not significantly change the low-temperature performance, but the high-temperature performance was remarkably improved; moreover, the capacity retention ratio and capacity recovery ratio after storage for 28 days at 60° C. were significantly improved, and the thickness expansion ratio was also significantly reduced.

In addition, the observation results on the degree of lithium precipitation show that, the lithium precipitation of the examples of the present application was low, basically no precipitation, thereby ensuring the safety performance of the battery.

The lithium-ion battery non-aqueous electrolyte provided by the invention not only improves the high-temperature storage and high-temperature cycle performance of $LiNi_{0.5}Co_{0.2}Mn_{0.3}O_2$ battery, but also has obvious improvement effect on the high-temperature performance of $LiCoO_2$, $LiNi_{1/3}Co_{1/3}Mn_{1/3}O_2$, $LiNi_{0.6}Co_{0.2}Mn_{0.2}O_2$, $LiNi_{0.8}Co_{0.1}Mn_{0.1}O_2$ and $LiNi_{0.8}Co_{0.15}Al_{0.05}O_2$ batteries. The composition of the battery positive electrode active materials and electrolyte additives are shown in Table 3.

TABLE 3

Positive electrode active materials and additive components and dosage in electrolyte

| | Positive electrode active materials | Compound represented by structural formula I or formula II and its dosage |
|---|---|---|
| Example 18 | $LiCoO_2$ | hexafluoroisopropyl bis (propargyl) phosphate: 1% |
| Example 19 | $LiNi_{1/3}Co_{1/3}Mn_{1/3}O_2$ | hexafluoroisopropyl bis (propargyl) phosphate: 1% |
| Example 20 | $LiNi_{0.6}Co_{0.2}Mn_{0.2}O_2$ | hexafluoroisopropyl bis (propargyl) phosphate: 1% |
| Example 21 | $LiNi_{0.8}Co_{0.1}Mn_{0.1}O_2$ | hexafluoroisopropyl bis (propargyl) phosphate: 1% |
| Example 22 | $LiNi_{0.8}Co_{0.15}Al_{0.05}O_2$ | hexafluoroisopropyl bis (propargyl) phosphate: 1% |
| Comparative example 9 | $LiCoO_2$ | 2,2,2-trifluoroethyl bis (propargyl) phosphate: 1% |
| Comparative example 10 | $LiNi_{1/3}Co_{1/3}Mn_{1/3}O_2$ | 2,2,2-trifluoroethyl bis (propargyl) phosphate: 1% |
| Comparative example 11 | $LiNi_{0.6}Co_{0.2}Mn_{0.2}O_2$ | 2,2,2-trifluoroethyl bis (propargyl) phosphate: 1% |
| Comparative example 12 | $LiNi_{0.8}Co_{0.1}Mn_{0.1}O_2$ | 2,2,2-trifluoroethyl bis (propargyl) phosphate: 1% |
| Comparative example 13 | $LiNi_{0.8}Co_{0.15}Al_{0.05}O_2$ | 2,2,2-trifluoroethyl bis (propargyl) phosphate: 1% |

Lithium-ion batteries were prepared according to the materials and dosage shown in Table 3 using the aforementioned methods, and tested according to the methods described above, the test results are shown in Table 4.

TABLE 4

Test results

| | Capacity retention ratio at 45° C., 300 cycles | Discharge efficiency at −20° C. 0.2 C | Storage for 28 days at 60° C. | | | Degree of lithium precipitation |
|---|---|---|---|---|---|---|
| | | | Capacity retention ratio | Capacity recovery ratio | Thickness expansion ratio | |
| Example 18 | 83.4% | 80.1% | 85.2% | 90.1% | 10.1% | 5 |
| Example 19 | 85.7% | 75.8% | 85.6% | 89.4% | 11.2% | 5 |
| Example 20 | 77.4% | 70.1% | 82.4% | 87.1% | 17.2% | 5 |
| Example 21 | 74.5% | 68.1% | 80.5% | 85.4% | 19.2% | 5 |
| Example 22 | 73.4% | 67.5% | 80.1% | 84.9% | 20.2% | 5 |
| Comparative example 9 | 75.6% | 75.2% | 81.4% | 95.2% | 21.1% | 2 |
| Comparative example 10 | 78.1% | 70.5% | 75.4% | 80.2% | 20.4% | 2 |
| Comparative example 11 | 70.5% | 65.4% | 78.1% | 82.3% | 26.2% | 2 |
| Comparative example 12 | 65% | 63.7% | 75.4% | 80.1% | 31.4% | 2 |
| Comparative example 13 | 63.1% | 62.7% | 66.1% | 80.1% | 34.1% | 2 |

According to the test results in Table 4, the high-temperature cycle, high-temperature storage, low-temperature discharge performance and lithium precipitation degree of $LiCoO_2$, $LiNi_{1/3}Co_{1/3}Mn_{1/3}O_2$, $LiNi_{0.6}Co_{0.2}Mn_{0.2}O_2$, LiNi$_{0.8}$Co$_{0.1}$Mn$_{0.1}$O$_2$ and LiNi$_{0.8}$Co$_{0.15}$Al$_{0.05}$O$_2$ batteries containing hexafluoroisopropyl bis (propargyl) phosphate electrolyte were better than those containing 2,2,2-trifluoroethyl bis (propargyl) phosphate.

Meanwhile, since the charging voltage of battery has a great influence on battery performance, increasing the charging voltage will lower the battery performance, especially the high-temperature storage and high-temperature cycle performance.

Lithium-ion batteries were prepared according to the materials and dosage shown in Table 5 using the aforementioned methods, and tested under the charging voltage shown in Table 5 according to the methods above, the test results are shown in Table 6.

TABLE 5

Battery charging voltage, additive components and dosage in electrolyte

| | Battery charging voltage | Compound represented by structural formula I or formula II and its dosage |
|---|---|---|
| Example 23 | 4.2 V | hexafluoroisopropyl bis (propargyl) phosphate: 1% |
| Example 24 | 4.3 V | hexafluoroisopropyl bis (propargyl) phosphate: 1% |
| Example 25 | 4.4 V | hexafluoroisopropyl bis (propargyl) phosphate: 1% |
| Example 26 | 4.5 V | hexafluoroisopropyl bis (propargyl) phosphate: 1% |
| Comparative example 14 | 4.2 V | 2,2,2-trifluoroethyl bis (propargyl) phosphate: 1% |
| Comparative example 15 | 4.3 V | 2,2,2-trifluoroethyl bis (propargyl) phosphate: 1% |
| Comparative example 16 | 4.4 V | 2,2,2-trifluoroethyl bis (propargyl) phosphate: 1% |
| Comparative example 17 | 4.5 V | 2,2,2-trifluoroethyl bis (propargyl) phosphate: 1% |

TABLE 6

Test results

| | Capacity retention ratio at 45° C., 300 cycles | Discharge efficiency at −20° C. 0.2 C | Storage for 28 days at 60° C. | | | |
|---|---|---|---|---|---|---|
| | | | Capacity retention ratio | Capacity recovery ratio | Thickness expansion ratio | Degree of lithium precipitation |
| Example 23 | 88.3% | 71.2% | 86.1% | 91.5% | 8.2% | 5 |
| Example 24 | 82.1% | 70.4% | 84.9% | 88.5% | 13.8% | 5 |
| Example 25 | 75.5% | 70.7% | 81.7% | 85.4% | 18.4% | 5 |
| Example 26 | 71.2% | 70.3% | 77.7% | 81.4% | 28.4% | 5 |
| Comparative example 14 | 80.1% | 64.8% | 81.3% | 85.6% | 16.7% | 2 |
| Comparative example 15 | 75.4% | 64.4% | 79.5% | 84.5% | 22.7% | 2 |
| Comparative example 16 | 66.5% | 64.7% | 74.5% | 80.7% | 28.5% | 2 |
| Comparative example 17 | 62..8% | 63.8% | 71.4% | 76.3% | 39.1% | 2 |

According to the test results of Table 6, it is apparent that the lithium-ion battery fabricated by using the electrolyte provided by the present invention has good performance under high charging voltage conditions, especially high-temperature storage and high-temperature cycle performance. The use of the electrolyte provided by the present invention in high voltage (e.g., 4.3V) lithium-ion batteries can better reflect its advantages.

The above content is a further detailed description of the present application in conjunction with the specific embodiments, and the specific implementation of the present application is not limited to the description. It will be apparent to those skilled in the art that a number of simple deductions or substitutions may be made without departing from the spirit of the present application, and shall be considered as being within the scope of the present application.

What is claimed is:

1. A lithium-ion battery non-aqueous electrolyte, comprising at least one selected from the group consisting of the compounds represented by structural formula I and structural formula II;

(Structural formula I)

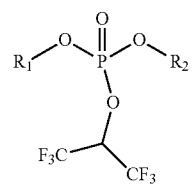

wherein, R$_1$ and R$_2$ are each independently selected from alkenyl having 2-5 carbon atoms, (Structural formula II)

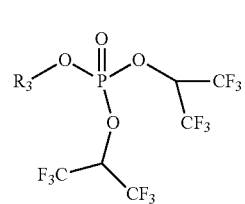

wherein, R$_3$ is selected from alkenyl having 2-5 carbon atoms and alkynyl having 2-5 carbon atoms;
in the non-aqueous electrolyte, the compound represented by structural formula I or the compound represented by structural formula II accounts for 1.5%-5% of the total mass of the non-aqueous electrolyte solution;
wherein the electrolyte further comprises one or more of cyclic carbonate, cyclic sultone, and cyclic sulfate.

2. The lithium-ion battery non-aqueous electrolyte according to claim 1, wherein the alkenyl of 2 to 5 carbon atoms includes vinyl, allyl, 3-butenyl, isobutenyl, and 4-pentenyl, the alkynyl of 2 to 5 carbon atoms includes ethynyl, propargyl, 3-butynyl, and 1-methyl-2-propynyl.

3. The lithium-ion battery non-aqueous electrolyte according to claim 1, wherein the compound represented by structural formula I is hexafluoroisopropyl bis (allyl) phosphate, the compound represented by structural formula II is bis (hexafluoroisopropyl) propargyl phosphate or bis (hexafluoroisopropyl) allyl phosphate.

4. The lithium-ion battery non-aqueous electrolyte according to claim 1, wherein the cyclic carbonate is at least one selected from the group consisting of vinylene carbonate, vinylethylene carbonate, and fluoroethylene carbonate.

5. The lithium-ion battery non-aqueous electrolyte according to claim 1, wherein the cyclic sultone is selected from the group consisting of one or more of 1,3-propane sultone, 1,4-butane sultone, and 1,3-propane sultone.

6. The lithium-ion battery non-aqueous electrolyte according to claim 1, wherein the non-aqueous electrolyte of the lithium-ion battery comprises a nonaqueous organic solvent, and the nonaqueous organic solvent is at least one selected from the group consisting of ethylene carbonate, propylene carbonate, butylene carbonate, dimethyl carbonate, diethyl carbonate, ethyl methyl carbonate and methyl propyl carbonate.

7. A lithium-ion battery, comprising a positive electrode, a negative electrode, a separator interposed between the positive electrode and the negative electrode, and an electrolyte solution, wherein the electrolyte solution is the non-aqueous electrolyte of the lithium-ion battery according to claim 1.

8. The lithium-ion battery according to claim 7, wherein the active material for the positive electrode is at least one of $LiNi_xCo_yMn_zL_{(1-x-y-z)}O_2$, wherein L is Al, Sr, Mg, Ti, Ca, Zr, Zn, Si or Fe, $0 \leq x \leq 1$, $0 \leq y \leq 1$, $0 \leq z \leq 1$, $0 \leq x+y+z \leq 1$.

9. The lithium-ion battery non-aqueous electrolyte according to claim 6, wherein the nonaqueous organic solvent is a composition of ethylene carbonate, diethyl carbonate and ethyl methyl carbonate.

* * * * *